(12) United States Patent
Casati et al.

(10) Patent No.: US 7,610,211 B2
(45) Date of Patent: Oct. 27, 2009

(54) INVESTIGATING BUSINESS PROCESSES

(75) Inventors: Fabio Casati, Palo Alto, CA (US); Ming-Chien Shan, Saratoga, CA (US); Mehmet Sayal, Sunnyvale, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 1298 days.

(21) Appl. No.: 10/177,273

(22) Filed: Jun. 21, 2002

(65) Prior Publication Data
US 2003/0236677 A1 Dec. 25, 2003

(51) Int. Cl.
*G06F 17/60* (2006.01)

(52) U.S. Cl. .......................... 705/7; 709/224; 714/20; 714/25

(58) Field of Classification Search ............... 705/7
See application file for complete search history.

(56) References Cited

U.S. PATENT DOCUMENTS

| | | | |
|---|---|---|---|
| 5,182,793 A * | 1/1993 | Alexander et al. ............ 706/13 |
| 5,553,235 A * | 9/1996 | Chen et al. .................... 714/20 |
| 5,696,701 A * | 12/1997 | Burgess et al. ................ 714/25 |
| 5,826,239 A | 10/1998 | Du et al. |
| 5,870,545 A | 2/1999 | Davis et al. |
| 5,890,133 A * | 3/1999 | Ernst ........................... 705/7 |
| 5,970,482 A | 10/1999 | Pham et al. |
| 5,999,911 A | 12/1999 | Berg et al. |
| 6,006,223 A | 12/1999 | Agrawal et al. |
| 6,014,673 A | 1/2000 | Davis et al. |
| 6,041,306 A * | 3/2000 | Du et al. ....................... 705/8 |
| 6,212,526 B1 | 4/2001 | Chaudhuri et al. |
| 6,236,994 B1 | 5/2001 | Swartz et al. |
| 6,243,105 B1 * | 6/2001 | Hoyer et al. .................. 345/440 |
| 6,278,977 B1 | 8/2001 | Agrawal et al. |
| 6,278,994 B1 | 8/2001 | Fuh et al. |
| 6,311,175 B1 | 10/2001 | Adriaans et al. |
| 6,326,962 B1 | 12/2001 | Szabo |
| 6,339,838 B1 | 1/2002 | Weinman, Jr. |
| 6,621,505 B1 * | 9/2003 | Beauchamp et al. ......... 715/764 |
| 6,631,362 B1 * | 10/2003 | Ullman et al. ................ 706/60 |
| 6,892,238 B2 * | 5/2005 | Lee et al. ..................... 709/224 |
| 6,996,536 B1 * | 2/2006 | Cofino et al. ................. 705/26 |
| 7,069,179 B2 * | 6/2006 | Kim et al. .................... 702/182 |

(Continued)

FOREIGN PATENT DOCUMENTS

WO    WO 01/73666    10/2001

(Continued)

OTHER PUBLICATIONS

Angela Bonifati et al., "Warehousing Workflow Data: Challenges and Opportunities," Sep. 2001. Proceedings of the 27th VLDB Conference, Roma, Italy.*

(Continued)

*Primary Examiner*—Albert DeCady
*Assistant Examiner*—Dave Robertson

(57) ABSTRACT

Systems and methods of investigating business processes are described. These systems and methods support real-time monitoring, analysis, management, and optimization of business processes. A graphical user interface enables users to apply data warehousing and data mining techniques to business process execution data and to visualize process execution data along multiple configurable dimensions and at different configurable levels of granularity.

30 Claims, 8 Drawing Sheets

U.S. PATENT DOCUMENTS

| | | | |
|---|---|---|---|
| 7,249,048 B1* | 7/2007 | O'Flaherty | 705/10 |
| 7,340,650 B2* | 3/2008 | Westmacott | 714/38 |
| 2001/0053991 A1 | 12/2001 | Bonabeau | |
| 2001/0054032 A1 | 12/2001 | Goldman et al. | |
| 2002/0062237 A1* | 5/2002 | Matsumoto et al. | 705/7 |
| 2002/0116362 A1* | 8/2002 | Li et al. | 707/1 |
| 2003/0126613 A1* | 7/2003 | McGuire | 725/109 |
| 2003/0144868 A1* | 7/2003 | MacIntyre et al. | 705/1 |
| 2008/0288306 A1* | 11/2008 | MacIntyre et al. | 705/7 |

FOREIGN PATENT DOCUMENTS

| | | |
|---|---|---|
| WO | WO 01/75747 | 10/2001 |
| WO | WO 02/05154 | 1/2002 |

OTHER PUBLICATIONS

Daniela Grigori et al., "Improving Business Process Quality through Exception Understanding, Prediction, and Prevention," Sep. 2001. Proceedings of the 27th VLDB Conference, Roma, Italy.*

Casati et al. "Definition, Execution, Analysis, and Optimization of Composite E-Services," Data Engineering, vol. 24, No. 1, Mar. 2001, p. 29-34.*

Ansari et al., S., "Integrating E-Commerce and Data Mining: Architecture and Challenges", 2001 IEEE International Conference on Data Mining Available, Nov. 29, 2001-Dec. 2, 2001 (8 pages).*

Büchner, A. G. and Mulvenna, M. D. 1998. Discovering Internet marketing intelligence through online analytical web usage mining. SIGMOD Rec. 27,4 (Dec. 1998), 54-61.*

Ansari, S., 2000. Integrating E-Commerce and Data Mining: Architecture and Challenges, Web-KDD, Aug., 2000.*

M. zur Mühlen, M. Rosemann, Workflow-based process monitoring and controlling—technical and organizational issues, in: R. Sprague (Ed.), Proceedings of the 33rd Hawaii International Conference on System Science (HICSS-33), IEEE Computer Society Press, Los Alamitos, California, 2000, pp. 1-10.*

Terje Jensen et al., "Managing Quality of Service in Multi-Provider Environment," Telecomm '99, pp. 1-8 (1999).

Fabio Casati et al., "Process Automation as the Foundation for E-Business," Proceedings of the 26th International Conference on Very Large Databases, Cairo, Egypt, 2000, pp. 688-691.

Larry Wong, "e-Services: A Key Component for Success," eAI Journal, pp. 18-25, Mar. 2001.

Lisa Cingiser DiPippo et al., "Expressing Quality of Service in Agent Communication," Proceedings of the 2001 International Conference on Artificial Intelligence, Las Vegas, Nevada, Jun. 2001.

Angela Bonifati et al., "Warehousing Workflow Data: Challenges and Opportunities," Proceedings of the 27th VLDB Conference, Roma, Italy (Sep. 2001).

Daniela Grigori et al., "Improving Business Process Quality through Exception Understanding, Prediction, and Prevention," Proceedings of the 27th VLDB Conference, Roma, Italy, (Sep. 2001).

"HP Process Manager White Paper," Hewlett-Packard Company (Oct. 30, 2001).

Umeshwar Dayal et al., "Business Process Coordination: State f the Art, Trends, and Open Issues," Proceedings of the 27th VLDB Conference, Roma, Italy (Sep. 2001).

Jon S. Sjolie, "WebSphere Business Process Integration," IBM Software Group (Nov. 2001).

* cited by examiner

INVESTIGATING BUSINESS PROCESSES

CROSS-REFERENCE TO RELATED APPLICATIONS

This application relates to the following co-pending applications, each of which is incorporated herein by reference: U.S. patent application Ser. No. 09/860,230, filed May 17, 2001; U.S. patent application Ser. No. 10/176,505, filed Jun. 21, 2002; and U.S. patent application Ser. No. 10/177,423, filed Jun. 21, 2002.

TECHNICAL FIELD

This invention relates to systems and methods of investigating business processes.

BACKGROUND

E-business is transforming corporations, markets, and the global economy. The conduct of business over Internet (e.g., buying, selling, servicing customers and collaborating with business partners) is affecting how business transactions are performed. Today, web interfaces allow customers to easily find products, services, providers and suppliers that they need, compare prices and qualities, and trade, buy, and get products and services delivered quickly. Customers may be presented with user-friendly graphical interfaces, targeted advertisements, up-to-date product catalogues, and personalized stores. The web facade, however, hides inefficiencies, manual and error-prone operations, and slow, complex, inflexible, and unmanageable systems. Indeed, in many e-business applications, the execution of business processes involves a substantial amount of human intervention in several aspects of business process execution, such as (repeated) data entry, process execution monitoring (a process that often requires tracking each process over several systems in order to find out its current advancement state), exception handling, and scheduling of process activities.

As a result, process design, automation, and management technologies are being used in both traditional and newly-formed, Interned-based enterprises in order to improve the quality and efficiency of their administrative and production processes, to manage electronic commerce (or e-commerce) transactions, and to rapidly and reliably deliver services to businesses and individual customers.

Inefficiencies in e-business processes impose high operating costs that are strongly affecting the profits of many e-business entities. To compete successfully, enterprises are demanding effective ways to implement e-business and deliver e-services over the Internet. In addition, in order to attract and retain customers as well as business partners, organizations also need to provide their services (i.e., execute their processes) with a high, consistent, and predictable quality. In general, in order to deliver such quality, business processes should be designed correctly, their execution should be supported by a system that can meet workload requirements, and the (human or automated) process resources should be able to perform their work items in a timely fashion.

SUMMARY

The invention features systems and methods of investigating business processes. The invention supports real-time monitoring, analysis, management, and optimization of business processes. The invention also provides a graphical user interface through which users may apply data warehousing and data mining techniques to business process execution data and visualize process execution data along multiple configurable dimensions and at different configurable levels of granularity.

In one aspect, the invention features a method of investigating a business process that comprises accessing process execution data and visualizing the process execution data. The accessed process execution data is generated by one or more components of a business process platform during execution of one or more instantiations of one or more business processes each involving a set of one or more activities each defined by a respective service, that is executed by a respective set of one or more resources. The process execution data is visualized with a focus on a user-selected process entity and summarized in terms of a user-selected statistic presented across a user-selected perspective corresponding to an attribute dimension of the user-selected process entity.

Embodiments in accordance with this aspect of the invention may include one or more of the following features.

In some embodiments, the step of visualizing the process execution data comprises generating a database query based upon the user-selected process entity, the user-selected statistic, and the user-selected perspective. The step of visualizing the process execution data may comprise mapping process execution data in accordance with the user-selected process entity, the user-selected statistic, and the user-selected perspective.

In some embodiments, the user-selected process entity is selected from one of: an aggregation of multiple businesses processes; a single business process; a business process service; and a business process resource.

In some embodiments, the user-selected perspective is selected from one of the following process entity attribute dimensions: time; a business process service; a business process resource; a business process initiator; a business process node. The user-selected perspective may be user-definable. A perspective definition preferably comprises a taxonomy comprising a set of one or more category labels each associated with a respective condition on the process execution data. A condition may correspond to one of: number of activations of a node; assignment of a node to an identified resource; duration of a node; duration of an identified business process; a value of data items at process instantiation time, completion time, or after execution of a node.

In some embodiments, the user-selected statistic is selected from one of: a count; running time; and a standard deviation of running time. The user-selected statistic may be user-definable. A statistic definition preferably comprises a concept label and an identified business process attribute.

In some embodiments, the step of visualizing the process execution data comprises filtering process execution data based upon a set of user-selected restrictions. The restrictions may be selected from one or more of: a business process service; a business process initiator; a business process resource; a business process node; and a time period.

In some embodiments, an execution of a business process instance may be monitored. The step of monitoring a business process instance may comprise detecting occurrence of an alert condition. The alert condition may be user-definable. In these embodiments, a notification may be generated in response to a detected alert condition occurrence.

In another aspect, the invention features a computer program that is operable to implement the above-described business process investigation method.

In other aspect, the invention features a system for investigating a business process, comprising a graphical user interface configured to prompt a user to select a process entity, a statistic, and a perspective corresponding to an attribute dimension of the user-selected process entity. Based upon the user-selected process entity, statistic and perspective, the graphical user interface is configured to query process execution data generated by one or more components of a business process platform during execution of one or more instantiations of one or more business processes each involving a set of one or more activities each defined by a respective service and performed by a respective set of one or more resources. The graphical user interface is configured to visualize the queried process execution data with a focus on the user-selected process entity and summarized in terms of the user-selected statistic presented across the user-selected perspective.

Embodiments in accordance with this aspect of the invention may include one or more of the following features.

In some embodiments, the graphical user interface is configured to prompt a user to select a process entity from: an aggregation of multiple businesses processes; a single business process; a business process service; and a business process resource.

In some embodiments, the graphical user interface is configured to prompt a user to select a perspective from one of the following process entity attribute dimensions: time; a business process service; a business process resource; a business process initiator; a business process node.

In some embodiments, the graphical user interface may be configured to prompt a user to define a perspective. A perspective definition may comprise a taxonomy comprising a set of one or more category labels each associated with a respective condition on the process execution data. A condition preferably corresponds to one of: number of activations of a node; assignment of a node to an identified resource; duration of a node; duration of an identified business process; a value of data items at process instantiation time, completion time, or after execution of a node.

In some embodiments, the graphical user interface is configured to prompt a user to select a statistic from: a count; running time; and a standard deviation of running time. The graphical user interface may be configured to prompt a user to define a statistic. A statistic definition may comprise a concept label and an identified business process attribute.

In some embodiments, the graphical user interface is configured to prompt a user to select a set of restrictions for filtering process execution data to be visualized. The graphical user interface may be configured to prompt a user to select one or more restrictions from: a business process service; a business process initiator; a business process resource; a business process node; and a time period.

In some embodiments, the system further comprises a monitoring engine operable to monitor execution of a business process instance. The monitoring engine preferably is operable to detect occurrence of an alert condition. The alert condition may be user-definable. The monitoring engine may be operable to generate a notification in response to a detected alert condition occurrence.

Embodiments in accordance with this aspect of the invention may include one or more of the following features.

Other features and advantages of the invention will become apparent from the following description, including the drawings and the claims.

DETAILED DESCRIPTION

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

Figure 1:
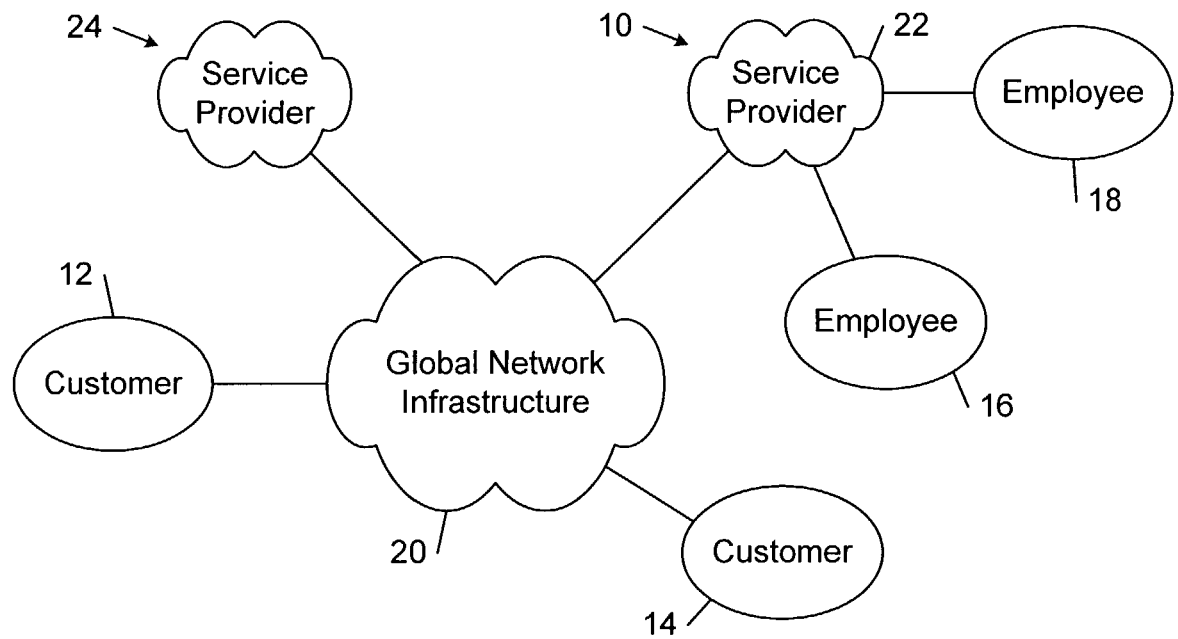
FIG. 1 is diagrammatic view of an e-business driven infrastructure that includes service providers, customers and employees that are interconnected by a global communication network.

Referring to FIG. 1, in one embodiment, a service provider 10 may deliver one or more services to customers 12, 14 and employees 16, 18 over a global communication network 20 and a service provider network 22. In order to deliver such services, service provider 10 executes processes and functions that may require the use of several resources and the invocation of other services, possibly offered by one or more remote service providers 24. For example, to deliver an e-procurement service, service provider 10 may invoke (web or traditional) services provided by suppliers, warehouses, and shipment companies, as well as services provided by internal (human or automated) resources, such as administrative employees, ERP (Enterprise Resource Planning) systems, Java beans, implementation of WSDL (Web Service Description Language) services, and printers.

Global communication network 20 may include a number of different computing platforms and transport facilities, including a voice network, a wireless network, and a computer network. Service requests may be transmitted, and service replies may be presented in a number of different media formats, such as voice, Internet, e-mail and wireless formats. In this way, customers 12, 14 may access the services provided by service provider 10 using any one of a wide variety of different communication devices. For example, in one illustrative implementation, a wireless device (e.g., a wireless personal digital assistant (PDA)) may connect to service provider 10 over a wireless network.

Communications from the wireless device may be in accordance with the Wireless Application Protocol (WAP). A wireless gateway converts the WAP communications into HTTP messages that may be processed by service provider 10. In another illustrative implementation, a voice device (e.g., a conventional telephone) may connect to service provider 10 over a voice network.

Communications from the voice device may be in the form of conventional analog or digital audio signals, or they may be formatted as VoxML messages. A voice gateway may use speech-to-text technology to convert the audio signals into HTTP messages; VoxML messages may be converted to HTTP messages based upon an extensible style language (XSL) style specification. The voice gateway also may be configured to receive from service provider 10 real time audio messages that may be passed directly to the voice device. Alternatively, service provider 10 may transmit formatted messages (e.g., VoxML, XML, WML, e-mail) that must be converted to a real time audio format (e.g., using text-to-speech technology) before the messages may be passed to the voice device. In a third illustrative implementation, a software program operating at a client personal computer (PC) may access the services of service provider 10 over the Internet.

Figure 2:
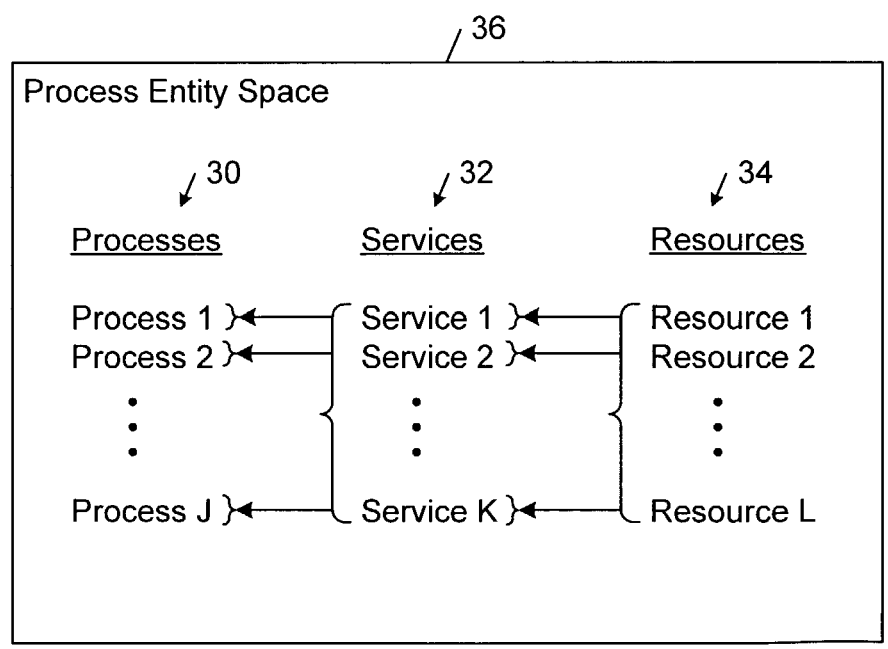
FIG. 2 is a diagrammatic view of a process entity space.

Referring to FIG. 2, the services provided by service provider 10 may be built from a collection of business process entities, including processes 30, services 32, and resources 34. In particular, any given service may be defined by a directed graph of business processes 30. Each process 30 is operable to invoke one or more services 32 for carrying out a specified activity. Each service 32 specifies the way in which a particular activity should be performed. Each service 32 is operable to invoke one or more resources 34, each of which performs an activity in accordance with the service specification. Each resource 34 may be invoked by one more services 32, and each service 32 may be invoked by one or more processes 30. In the context of process entity space 36, each business process 30 may be visualized along multiple dimensions and multiple levels of granularity based upon the mappings between the business process and its associated services and resources.

Figure 3:
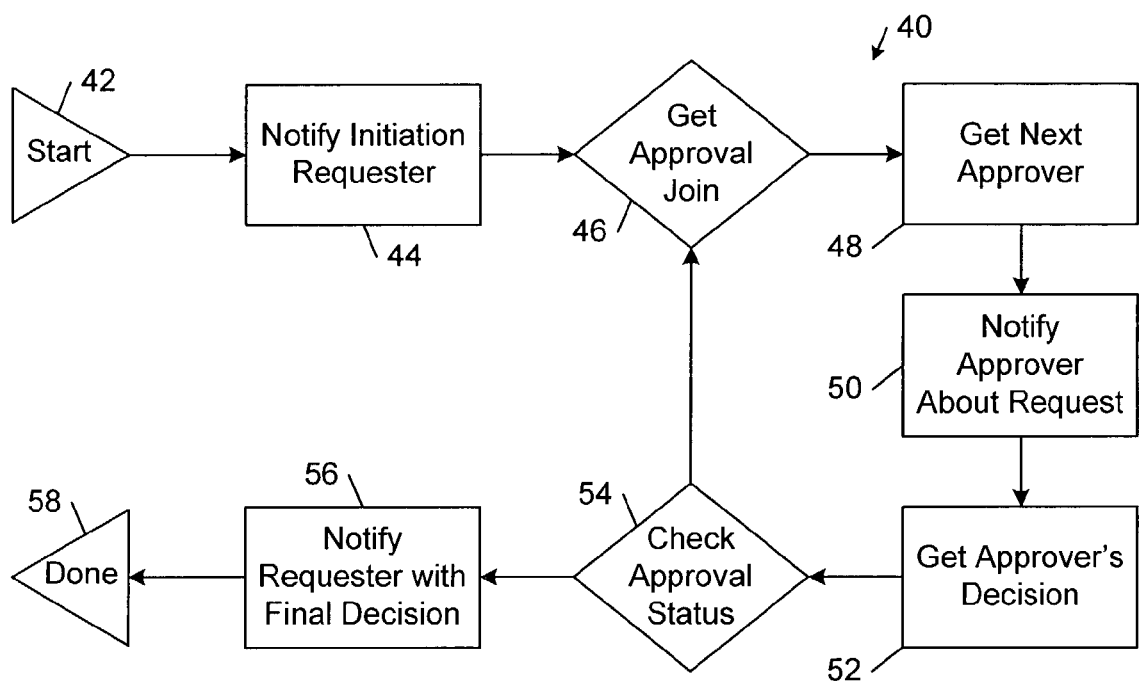
FIG. 3 is a workflow diagram of an expense approval process.

As shown in FIG. 3, a business process may be modeled as a directed graph 40 having at least four types of nodes including work nodes, route nodes, start nodes, and completion nodes. A work node represents the invocation of a service (or activity). Each work node is associated with a service description that defines the logic for selecting a resource or resource group to be invoked for executing the work. The service definition also identifies the data items to be passed to the resource upon invocation (e.g., execution parameters or input data) and to be received from the resource upon completion of the work (e.g., status values, output data). Several work nodes may be associated to the same service description. Route nodes are decision points that control the execution flow among nodes based on a routing rule. A start node denotes the entry point to the process, and completion nodes denote termination points. A process definition may be instantiated several times and multiple instances may be concurrently active. Activity executions may access and modify data included in a case packet. Each process instance has a local copy of the case packet.

As used herein, the term "service" refers broadly to any functionality invoked during the execution of a process or function, independent of the technology that is used to deliver it. A service may be composed of a single atomic activity to be executed by a human or automated resource. Alternatively, a directed graph that is composed of a combination of work nodes and decisions may be referred to as a service. The term "service" permits a convenient reference by name to a specific graph of activities and decisions without reiterating these individual components. In this way, the series of activities may be invoked by referring to the service instead of the component sequence of tasks. The introduction of services enables a single definition to be re-used multiple times within the same process or in multiple processes. Thus a service may be used multiple times by a given process or by more than one process.

In the embodiment illustrated in FIG. 3, graph 40 models an expense approval process. The process begins in start node 42 with the requester. The case packet data for the expense approval process may include, for example, the identity of the requester, the expense amount, the reasons, and the names of the individuals that should evaluate the request. Once the process is initiated, the requester is notified in work node 44. Work node 44 may invoke another service for notification. For example, notification may be performed by the service send_email. Upon invocation of the send_email service, an email is sent to the requester with notification that the process has begun. The process loops among the list of individuals until either all of the approvers approve the expense request or one of the approvers rejects the expense request (nodes 46-58). (Join 46 is an OR join that fires whenever any input fires.) The final decision is reported to the requester in work node 56 before the process terminates at completion node 58.

Work nodes are associated to services. At run time, when a work node is executed, the associated service (that characterizes the function to be performed) is dispatched to internal or external resources (e.g., an employee, a computer system within the domain of service provider 10, or an application operated by another business entity). The appropriate resources may be selected by a resource broker (also called resource executive) based upon business logic that may be included as part of the process definition, work node definition, or system configuration. A work item typically is identified by a name (e.g., approve_request) and by a set of data items (e.g., the name of the requester, the purpose of the request, and the amount of money required to-fulfill the request). The work may be dispatched in several different ways. For example, the work item may be inserted into a resource work list, in which case resources log into the system to retrieve work items. In other approaches, a process automation system sends work items to the selected resources, in which case resources are presented with a set of work items to be performed when the resources access their work lists. A resource may select one or more items from the work list, execute the selected items, and return the result to the process automation system.

Figure 4:
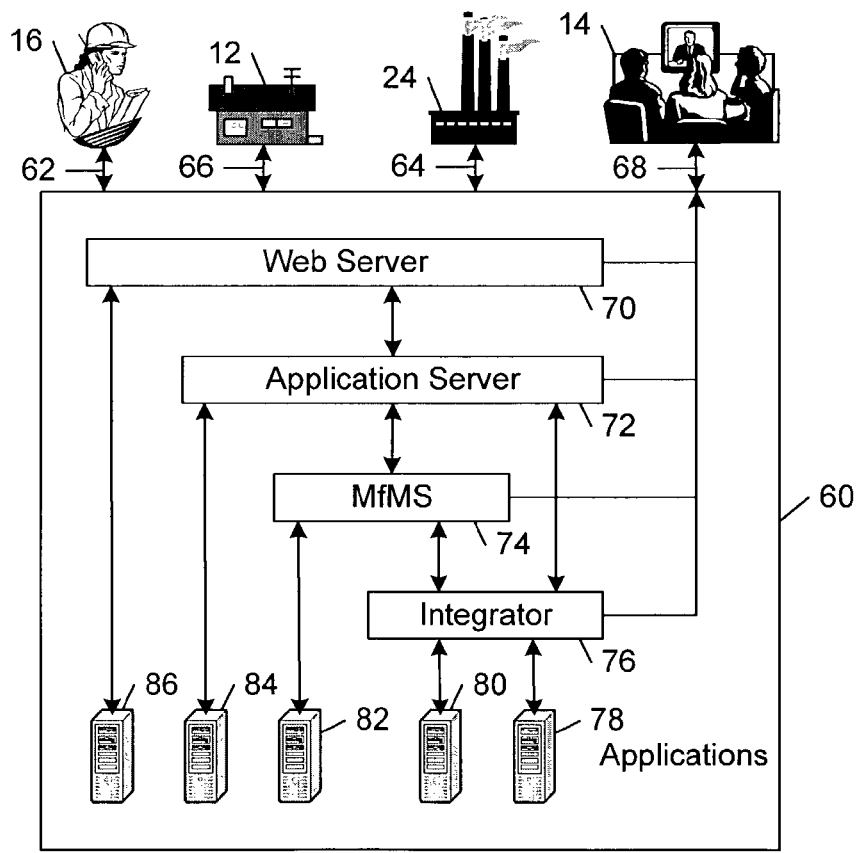
FIG. 4 is a diagrammatic view of a business process platform supporting execution of internal electronic interactions within a domain of a business entity and managing external electronic interactions between the business entity and a plurality of external entities.

Referring to FIG. 4, in one embodiment, service provider 10 (FIG. 1) includes a business process platform 60 that supports execution of internal electronic interactions 62 within a domain of service provider 10 and manages external electronic interactions 64, 66, 68 (e.g., business-to-business and business-to-customer interactions) between service provider 10 and a plurality of external entities 24, 12, 14. Business process platform 60 includes a web server 70, an application server 72, a work flow management system (WfMS) 74, an integration platform (or integrator) 76, and a plurality of back-end applications 78, 80, 82, 84, 86. Web server 70 is configured to accept and serve static HTTP requests and redirect dynamic requests. Application server 72 is configured to process non-static HTTP requests. In some embodiments, application server 72 may offer an implementation of the Java J2EE (Java 2 Platform, Enterprise Edition) specification and provide features supporting reliable, personalized, multi-device delivery of business services. Application server 72 also may provide XML (extensible Markup Language) document management capabilities. Workflow management system 74 is configured to automate the execution of business processes within and across the domain of service provider 10. Workflow management system 74 also may provide some level of business process monitoring and analysis functionality. Integration platform 76 (e.g., a message broker) is configured to hide heterogeneity of back-end applications 78-86 and to provide a homogeneous model and protocol for accessing heterogeneous applications. Back-end applications 78-86 support specific, vertical functionalities, such as procurement, inventory management, or meeting room reservation. Business process platform 60 also may include other middleware applications. For example, business process platform 60 may include Web Services Platforms (WSPs) that allow the development, brokering and delivery of Web Services (WS) and support business-to-business standards and protocols, such as RosettaNet, UDI (Uniform Driver Interface) and ebXML (electronic business XML).

In operation, business process platform 60 executes one or more business processes each of which invokes a respective set of one or more services, executed by one or more resources.

The invocation of a service may involve sending a single message, or may consist of several message exchanges. For example, when accessing an e-publishing service, clients may upload a document, then select a template, then compose the booklet, and finally print the booklet. A set of messages between a client and a service is referred to herein as a "conversation." Each interaction between a client and a service, and between the service and the set of services it invokes, occurs in the context of a conversation. Examples of conversation types include requests for quotes and purchases of goods. The context of an active conversation may be defined by one or more measurable attributes selected from the following:

a conversation type identifier (e.g., RosettaNet PIP 314)
a conversation instance identifier, partners involved in the conversation
conversation initiation and completion time
deadlines and other quality of service parameters
every message exchanged during the conversation, including:
    message unique identifier
    message source
    message target
    message parameters
    message timestamps (denoting, e.g., when a message was sent and/or received)
    indication of whether the message is in reply to some other message
an indication of whether the conversation is executed with the context of another conversation (e.g., a conversation between providers executed in the context of a conversation between a provider and a customer)

For every service executed by service provider 10, a conversation audit log containing information about the context and context changes that occur during a conversation is stored. The conversation audit log data may be collected by one or more of the components 70-86 of business process platform 60 and stored in respective databases. Any preliminary analysis data generated by the components 70-86 of business process platform 60 also is stored in respective databases.

Figure 5:
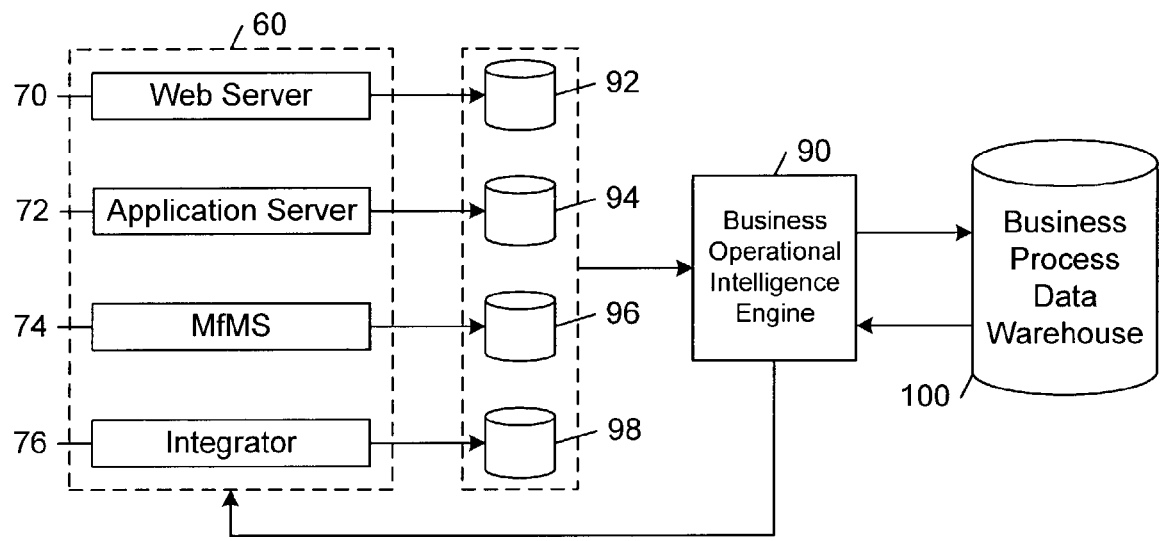
FIG. 5 is a block diagram of a system for investigating a business process that includes a business operational intelligence engine that is operable to build a business process data warehouse by populating a database with service execution data generated by one or more components of the business process platform of FIG. 4.

As shown in FIG. 5, in one embodiment, service provider 10 also includes a business operational intelligence engine 90 that supports the definition, execution, and tracking of business processes. Business operational intelligence engine 90 has the ability to log information about the business processes it supports, including, for example, the start and completion time of each activity, its input and output data, the resource that executed it, as well as every event (message) sent or received by a process. The audit log data maintained by the components of business process platform 60 may be stored in respective databases 92, 94, 96, 98. As explained in detail below, business operational intelligence engine 90 is configured to build a business process data warehouse 100 by extracting the process execution data from databases 92-98. The business operational intelligence engine 90 allows high-level analysis information about process executions to be delivered to users, such as business and IT (Information Technology) analysts, in a way that is easy to access and to consume. In particular, business operational intelligence engine 90 enables users to visualize a business process with a focus on a user-selected process entity and summarized in terms of a user-selected statistic presented across a user-selected perspective corresponding to an attribute dimension of the user-selected process entity. Business operational intelligence engine 90 enables users to analyze the information stored in business process data warehouse 100 to reveal problems and inefficiencies in process executions and identify solutions in order to improve process execution quality, both as perceived by external users in terms of better and faster processes (external quality), and as perceived by service providers in terms of lower operating cost (internal quality). Business operational intelligence engine 90 also allows critical issues to be identified and highlighted in a timely fashion, and allows alerts to be delivered to a variety of applications and devices. In addition, business operational intelligence engine 90 allows processes to be managed dynamically by providing feedback to process engines that optimizes process executions. In addition, information on active processes may be used to monitor active process instances and to provide alerts of predicted and actual quality degradations.

Figure 6:
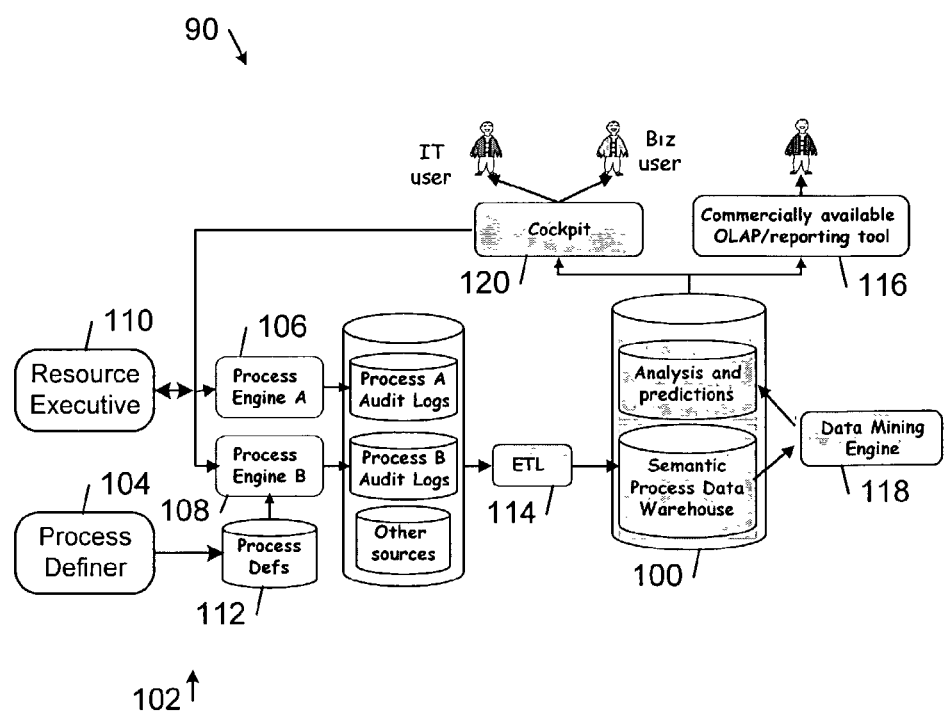
FIG. 6 is a block diagram of internal components of the business operational intelligence engine and the business process data warehouse that are shown in FIG. 5.

Referring to FIG. 6, in one embodiment, business operational intelligence engine 90 includes a business process automation tool 102 (e.g., an HP Process Manager, available from Hewlett-Packard Company of Palo Alto, Calif., U.S.A.) comprising a process definer 104, one or more process engines 106, 108, and a resource executive 110. Process definer 104 defines processes as a collection of nodes, services, and input and output parameters. The process definitions are stored in a database 112. Database 112 may contain, for example, a process definition that includes a start node, a completion node, work nodes, route nodes, and services to be invoked by the process. A process definition also includes an indication of the way in which the nodes are interconnected. Process engines 106, 108 execute processes by scheduling nodes to be activated. When a work node is activated, process engines 106, 108 retrieve the associated service definition and resource assignment rule. The resource assignment rule is communicated to the resource executive 110, which identifies one or more resources (e.g., a specific vendor, employee, or piece of equipment) that should execute the service. During execution of processes, process engines 106, 108 step through the process definitions to determine which activities should be performed next, and use the resource executive 110 to assign a resource (or resources) to the activities. Process engines 106, 108 send activity requests and any data needed to perform the activities to the resources identified by the resource executive 110. When the activity is completed, the process engines 106, 108 refer to the process definitions to determine the next nodes to be activated.

An extract, transfer, and load (ETL) application 114 collects data from the audit logs and loads the data into business process data warehouse 100. ETL application 114 performs conventional warehousing functions, such as data cleaning, and formats the process execution data into a predefined record format. Additional details relating to the structure and operation of the business process data warehouse 100 and ETL application 114 may be obtained from U.S. patent application Ser. No. 09/860,230, filed May 17, 2001, by Fabio Casati et al. and entitled "Method of Identifying and Analyzing Business Processes from Workflow Audit Files," and Angela Bonifati et al., "Warehousing Workflow Data: Challenges and Opportunities," Proceedings of VLDB'01, Rome, Italy (September 2001), each of which is incorporated herein by reference. Data in the business process data warehouse 100 may be accessed directly with a commercial reporting tool 116 (e.g., Crystal Reports, available from Crystal Decisions, Inc. of Palo Alto, Calif., U.S.A., and Oracle Discoverer available from Oracle Corporation of Redwood Shores, Calif.). In addition, a data mining tool 118 may apply data mining techniques on top of business process data warehouse 100 to assist analysts in identifying the causes of high and low-quality executions and deriving prediction models that may be used at run-time to predict process execution quality for running processes.

Business operational intelligence engine 90 also includes a business process cockpit (BPC) 120 that enables a user to investigate a business process by supporting real-time monitoring, analysis, management, and optimization of business processes running on top of the business process automation tool 102. Business process cockpit 120 provides a graphical user interface through which users may apply data warehousing and data mining techniques to business process execution data. As explained in detail below, business process cockpit 120 allows business and IT users to analyze data contained in business process data warehouse 100 according to multiple perspectives. The business process cockpit 120 is designed to make it easy for (non-technical) users to define a wide range of queries and, more generally, of analysis and quality criteria, without writing any code. The information is presented in an intuitive and direct format, so that users may easily and immediately get the information they need. In addition, business process cockpit 120 is configurable according to the needs and preferences of different users. Business process cockpit 120 also monitors processes, services, resources, and other process-related entities, and inform users of actual or foreseen quality degradation. Business process cockpit 120 also may send notifications to users on the medium of their choice. Business process cockpit 120 is operable to manage running processes by tuning process and system configuration parameters (such as the process priority) and by notifying events to processes.

Figure 7:
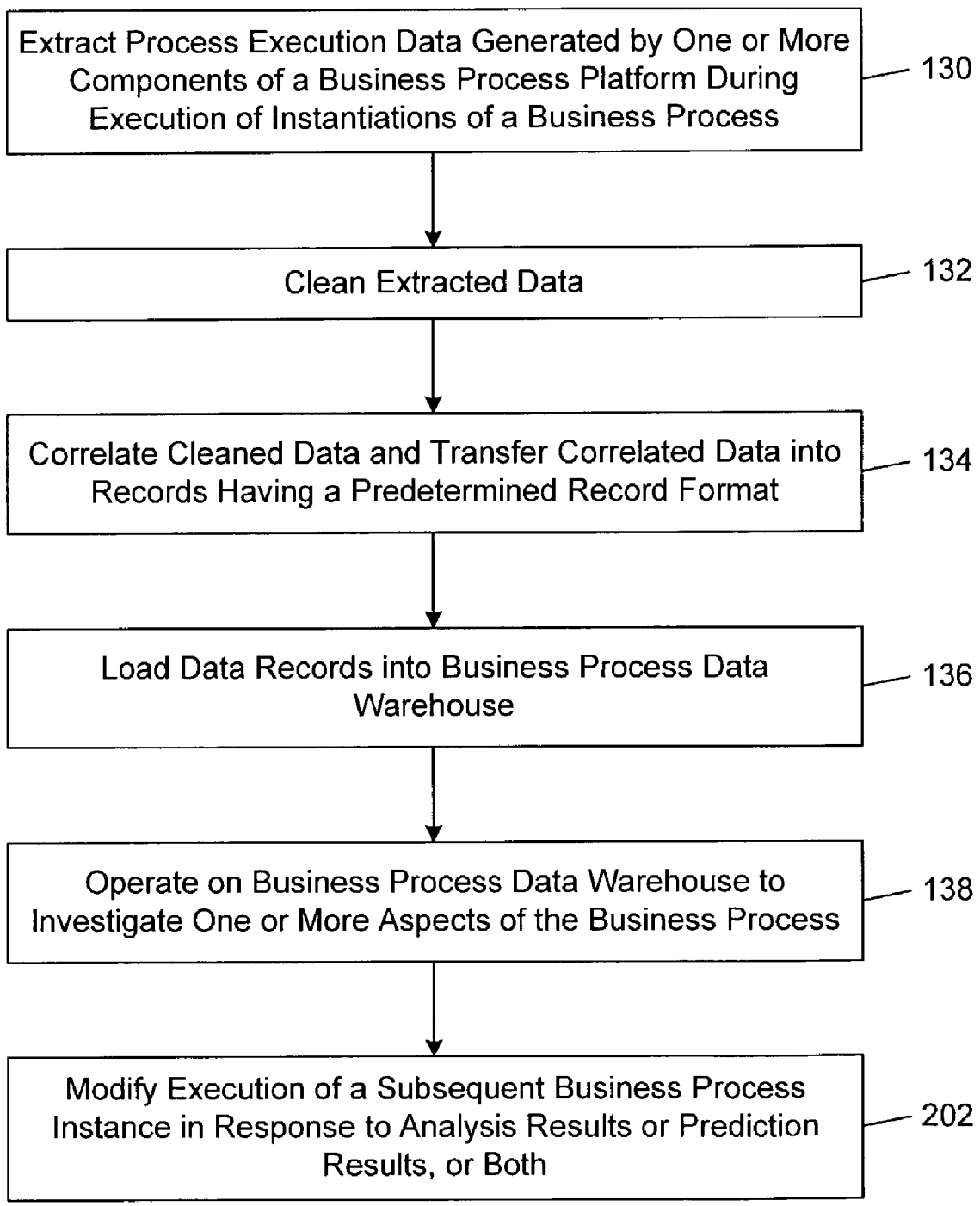
FIG. 7 is a flow diagram of a method of investigating a business process.

Referring to FIG. 7, in one embodiment, a user may operate business operational intelligence engine 90 to investigate a business process as follows. Initially, business operational intelligence engine 90 extracts process execution data generated by one or more components of business process platform 90 during execution of instantiations of the business process (step 130). The extract, transfer and load application 114 cleans the extracted data, for example, in accordance with a conventional data warehouse data cleaning process (step 132). The cleaned data is correlated across multiple business process platform components for each business process instantiation, and the correlated data is transferred into records having a predetermined record format (step 134). The data records are loaded into business process data warehouse 100 (step 136). Next, business operational intelligence engine 90 operates on business process data warehouse 100 to investigate one or more aspects of the business process (step 138).

Figure 8:
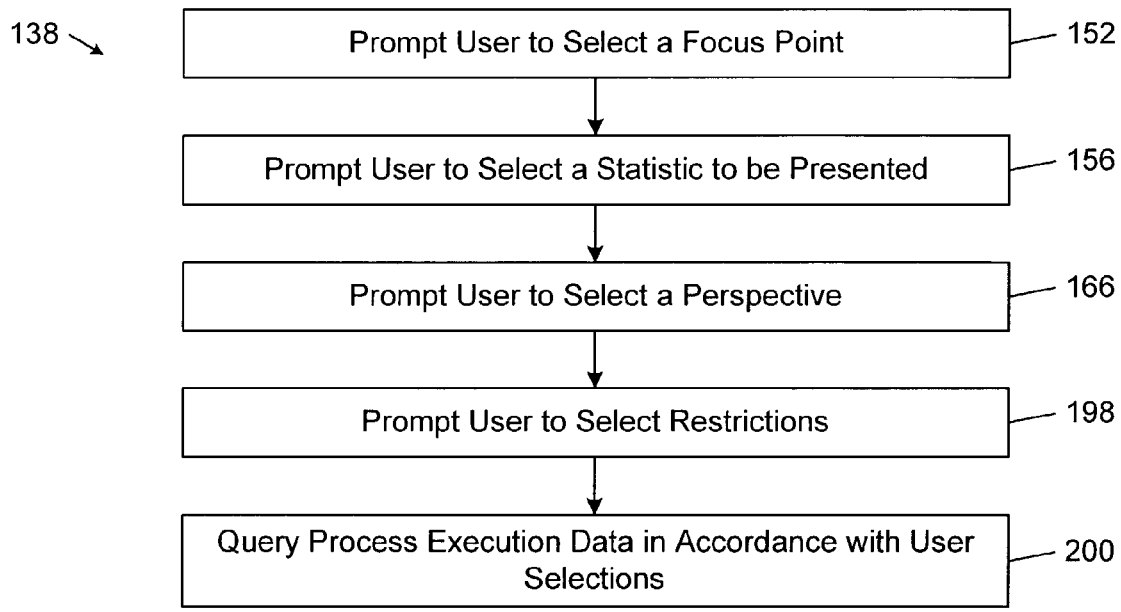
FIG. 8 is a flow diagram of a method of generating a business process data warehouse query for investigating a business process.
Figure 9:
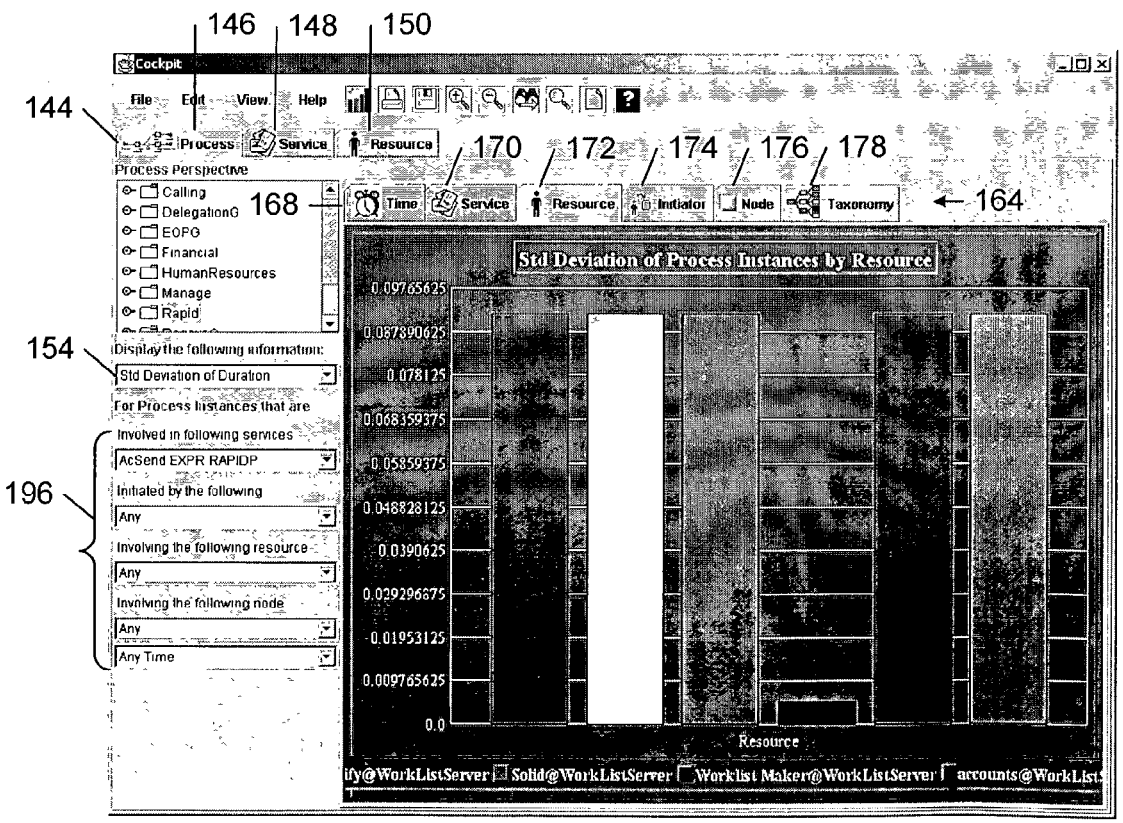
FIG. 9 is a graphical user interface that is configured to guide a user through a process of defining a data warehouse query for investigating a business process.

Referring to FIGS. 8, 9, 10, 11, 12 and 13, and initially to FIGS. 8 and 9, in one embodiment, business process cockpit 120 is operable to guide a user through a process of defining a data warehouse query as follows.

Initially, the user is prompted to select a focus point 142 by activating one of the following process entity tabs: an overall system focus point tab 144, a process focus point tab 146, a service focus point tab 148, and a resources focus point tab 150 (step 152). Business process cockpit 120 visualizes process execution data (and related quality metrics) according to the selected focus point. A focus point identifies the process entity that is the focus of the analysis. For example, under the process focus, information about a specific process or set of processes is displayed. Under the resources focus, data related to individual resources or groups of (human or automated) resources is displayed. Under the services focus, the user will be able to see statistics and metrics about the web services invoked during the execution of business processes. In general, for each focus point, business process cockpit is operable to present basic statistical information (e.g., average execution time and performance), value-related information (e.g., associated revenues and costs), and behavioral information. In addition, as explained in detail below, when visualizing on a specific focus point, the business process cockpit 120 is operable to narrow the analysis based upon a selected perspective. For example, when focusing on a specific process, it is possible to analyze the process in general, or with respect to specific time values (e.g., analyze instances started in a certain time window) or specific resource values (e.g., analyze only instances in which a specific resource was involved).

The user also is prompted to select from a pull down menu 154 a statistic in accordance with which the selected focus is to be summarized (step 156). For each focus point, business process cockpit 120 may present basic statistical information (such as average execution time and performance), value-related information (associated revenues and costs), and quality information, such as resource performance and ratings as described in U.S. patent application Ser. No. 10/176,505, filed Jun. 21, 2006.

Figure 10:
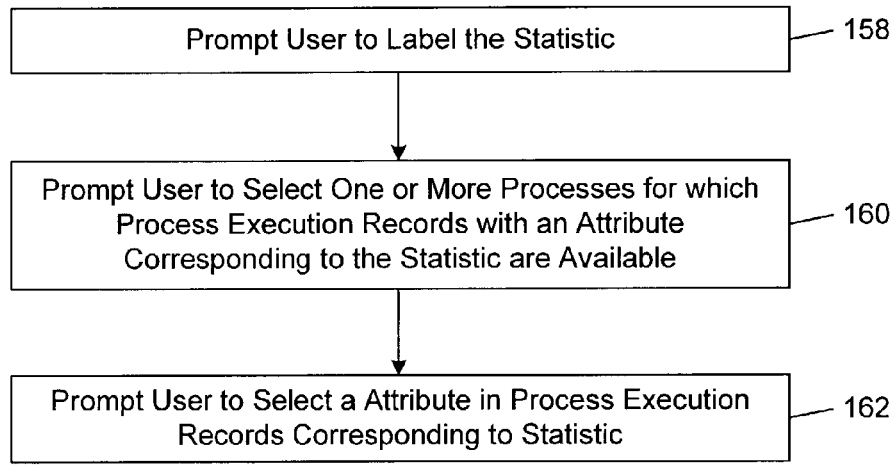
FIG. 10 is a flow diagram of a method of guiding a user through the process of defining a statistic in terms of which process execution data may be visualized.

Referring to FIG. 10, in some embodiments, in addition to being able to select a predefined statistic, user may define a statistic for summarizing process execution data as follows. In these embodiments, the user initially is prompted to label the statistic (step 158). Next, the user is prompted to select one or more processes for which process execution records with an attribute corresponding to the statistic are available (step 160). Finally, the user is prompted to select an attribute in the process execution records corresponding to the statistic (step 162). For example, a user may define a "cost" statistic by identifying a process, such as an expense approval process, that involves certain cost data of interest and by specifying the specific process execution variable corresponding to the cost value that is stored for each business process instance. In these embodiments, a user flexibly may define statistics that reflect process characteristics of interest to the user. For example, users may associate value-related information to processes, services and resources. This allows users to state that the execution of a service has a certain cost for the company, which may be fixed or may depend on service execution time, output data, executing resource, or a combination of these factors.

For a service, revenues and profits may be defined based upon:
 The resource that executes the service
 The service execution time
 The service activation time
 The service input or output data
 A fixed amount For example, users may state that the cost for a service is $A plus an additional $B, where B=10 if variable service_area=Germany and B=15 is service_area=Poland. If no function has been specified, then a fixed value of zero is assumed for both cost and revenue. In some embodiments, business process cockpit 120 computes cost/revenue information only on completed service executions. The result of the cost or revenue function may be defined (and therefore return a value), or it may be undefined. In the latter case, the information is flagged as non-available and it is not assumed to be equal to zero, as this would invalidate aggregate statistics over service execution cost.

For process instances, revenues and profits may be defined based upon:
 The process instance execution time
 The process instance activation time
 The process instance input or final data
 The sum of the service execution costs
 A fixed amount As for the service execution costs, business process cockpit computes cost/revenue information only on completed process instance executions. If no function has been specified, then a fixed value of zero is assumed for both cost and revenue. If the function has been specified bit it is undefined, then the information is flagged as non-available and it is not assumed to be equal to zero.

Referring back to FIGS. 8 and 9, the user is further prompted to select from a set of tabs 164 a perspective from which the selected statistical information is to be summarized (step 166). As mentioned above, for every focus point, the information may be analyzed according to different perspectives. A perspective defines a way to view the information of the selected focus point. In general, a perspective corresponds to an attribute dimension of the user-selected focus point. For example, viewing the process focus point under the time perspective, users can see process statistics by year, week, and day of the week. It is noted that not all perspectives are available for a given focus point (e.g., the process perspective does not have meaning when observed under the process focus point). In the illustrated embodiment, business process cockpit 120 includes the following perspectives: a time perspective 168, a service perspective 170, a resource perspective 172; an initiator perspective 174; a node perspective 176; and a user-defined taxonomy perspective 178. Under the time perspective 168, data is shown by time. This perspective has several sub-perspectives, allowing users to view data aggregated by, for example, calendar or fiscal year, quarter, or month, by week, by day of the week, or hour of the day. Under the services perspective 170, the presented data is aggregated depending on the service that has been executed. Under the resources perspective 172, data that is shown depends on the resource that took part in the execution. For example, by looking at the service focus point under the resource perspective 172, users can service execution data aggregated depending on which resource (i.e., service provider) executed the service. Alternatively, as shown in FIG. 9, the average process instance duration may be shown in terms of the resources that have been involved in process execution. An analyst may use this report to identify the cause of slow process executions. Under the initiator perspective 174, the presented information is aggregated by the initiator of a selected business process. Under the node perspective 176, the presented information is aggregated by the nodes of a selected business process definition. As explained in detail below, under the taxonomy perspective 178, users may view data aggregated on the basis of user-defined taxonomical information. Other embodiments may include a different set of perspectives, some of which may be the same as or different from the perspectives in the illustrated embodiment. For example, in some embodiments, business process cockpit 120 may include a process perspective that presents information aggregated by process. In general, data may be aggregated in terms of single processes, services and resources or in terms of groups of processes, services and resources. Although resource grouping may be defined at the process automation level (e.g., by work lists), such definitions typically are driven by work assignment needs. An analyst may desire to visualize process execution data with resources grouped in different ways. For example, analysts may want to observe the overall load or performance if a department. People in a department are likely to belong to different work lists or there may not be a department-wide work list, or both. In this case, business process cockpit 120 allows users to define groups to which resources may be assigned. A resource may be assigned to more than one group, and groups may be arranged into hierarchies. However, no cycles in the member relationship are allowed (i.e., a group cannot contain itself). Once a group has been defined, business process cockpit 120 may perform analysis at the group or sub-group level.

Figure 11:
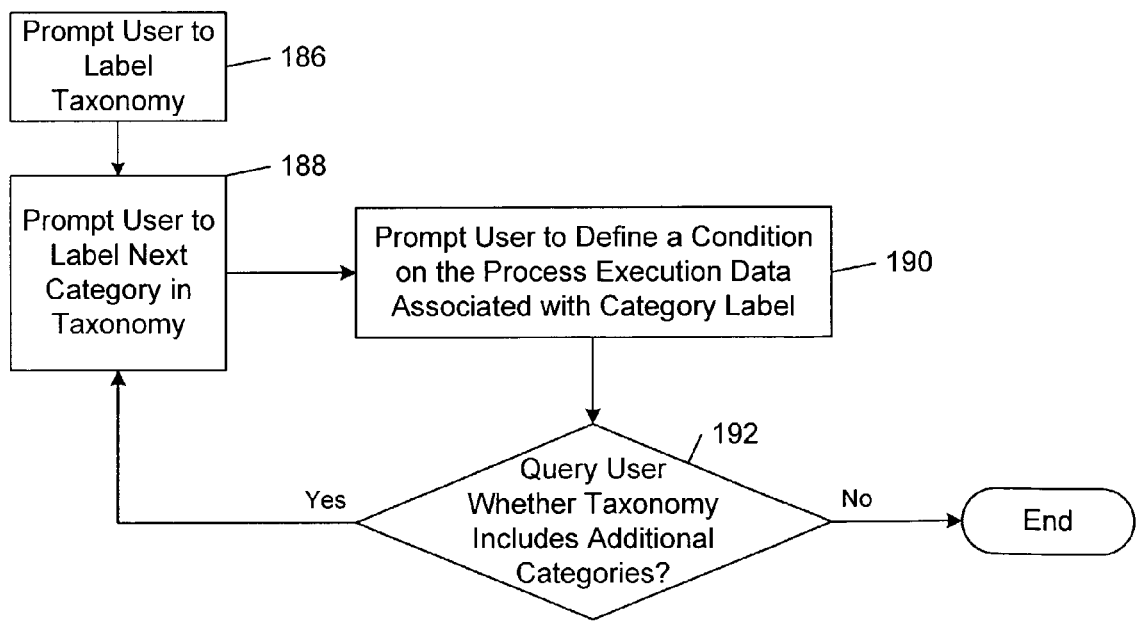
FIG. 11 is a flow diagram of a method of guiding a user through the process of defining a business process perspective.
Figure 12:
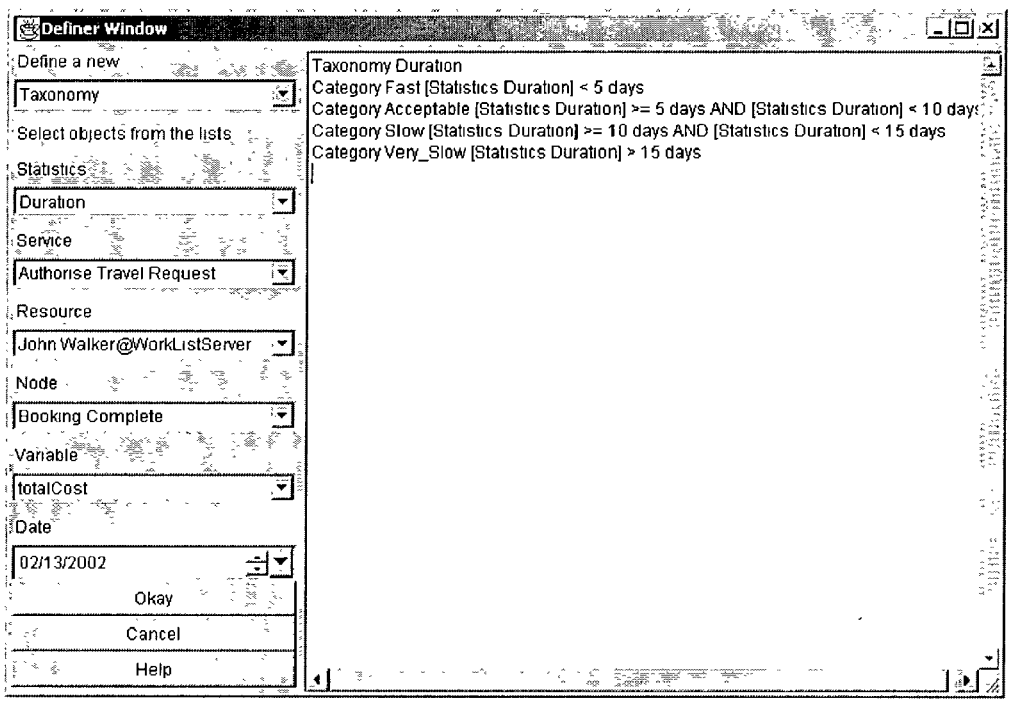
FIG. 12 is a graphical user interface that is configured to guide a user through a process of defining a business process perspective.
Figure 13:
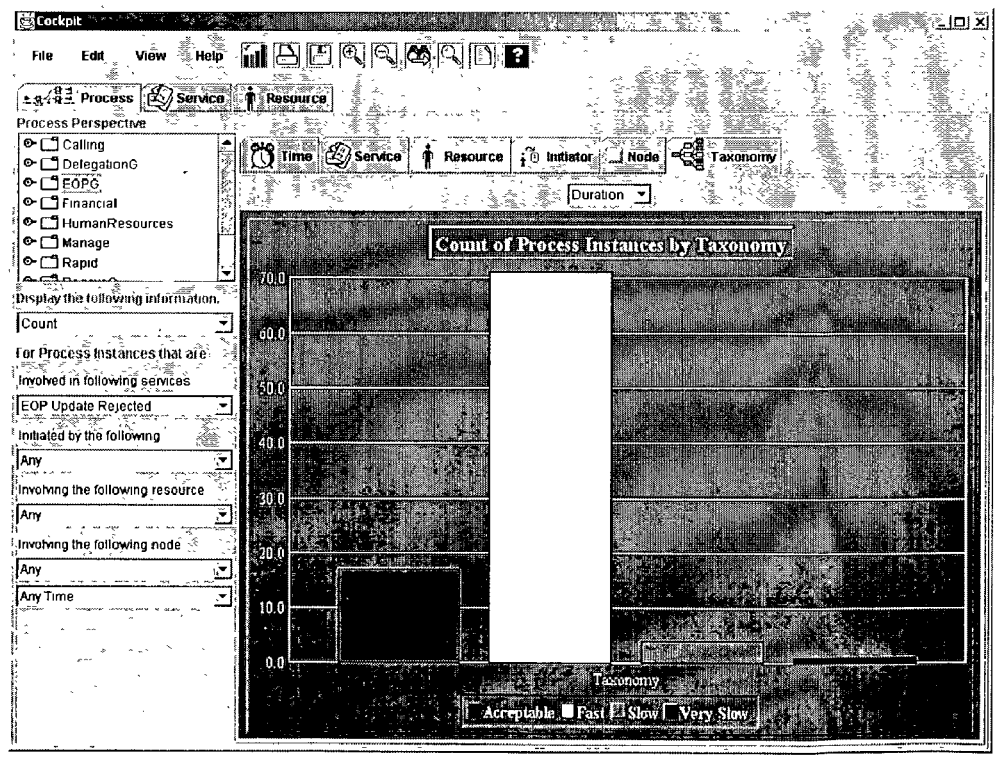
FIG. 13 is a graphical user interface that is configured to visualize process execution data summarized in terms of a user-selected statistic across a user-defined perspective.

Referring to FIGS. 11, 12 and 13, in some embodiments, a user may define a taxonomy perspective 178 as follows. In general, a taxonomy is a user-defined way to classify instances of a process depending on its characteristics. Many taxonomies may be defined for the same process, and each taxonomy can have several categories. By construction, for each taxonomy, a process instance should fall within one and only one category at any given time. In some embodiments, however, if an instance belongs to more than one category, it is inserted in a special category "error," which is defined implicitly for each taxonomy. In addition, if it cannot be determined in which category a particular instance belongs, it is inserted in another special category "undefined," which also is defined implicitly for each taxonomy.

Initially, a user is prompted to label the taxonomy to be defined (step 186). Next, the user is prompted to select a label for a category in the taxonomy (step 188). The user is prompted to define a condition on the process execution data that is associated with the category (step 190). The condition is specified by identifying a process execution characteristics for a set of process instance execution data records stored in data warehouse 100 for one or more processes. This is done by specifying a Boolean condition on the process instance execution data. Examples of Boolean conditions that may be of interest are: number of activations of a node; assignment of a node (or of any node) to a given resource; duration of nodes; duration of an entire process; value of data items at process instantiation time, completion time, or after execution of a node. The user is prompted to repeat the process until all of the categories in the taxonomy have been specified (step 192).

As shown in FIGS. 12 and 13, in some embodiments, categories may be defined by instantiating a template 194. The template identifies a generic process behavior, such as: Processes P in which a resource R has been involved in the execution. A template may be then instantiated by specifying the parametric parts (P and R in this example). For example in the illustrated embodiment, a "duration" taxonomy is defined by specifying conditions on a set of four categories: fast (defined as processes lasting less than 5 days), acceptable (between 5 and 10 days), slow (between 10 and 15 days), and very slow (more than 15 days). In general, complex categories may be defined by conjunction or disjunction of simple categories. Business process cockpit 120 may provide several templates that may be instantiated by filling out a form that is translated by business process cockpit 120 into a set of SQL statements. Template libraries may be updated by downloading templates from a web site. Templates may be implemented by means of SQL statements that analyze data in the business process data warehouse 100 and determine the categories to which a process instance belongs. For example, a taxonomy "outcome" may include the categories "success" and "failure," while the taxonomy performance may include the categories fast, acceptable, slow. In one exemplary embodiment, FIG. 13 illustrates the distribution of the number of instances of a "Travel Expense Reimbursement" process among the categories of the "duration" taxonomy defined in FIG. 12. By using taxonomies, business users may analyze the aspects of the process in which they are interested and organize reporting data as they see fit, avoiding focusing on details that may have little relevance to them.

Referring back to FIGS. 8 and 9, the user also is prompted to select one or more restrictions 196 for filtering process execution data to be visualized (step 198). In the embodiment illustrated in FIG. 9, the characteristics described in the restrictions menus may be used to restrict the data considered in the analysis. For instance, business process cockpit 120 may be configured to show data related to processes started within a given time window, or classified in certain categories, or that involved the execution of a certain service. The restriction attributes are exactly the same as the perspectives. This feature improves the ability of business analysts to use the tool.

Figure 14:
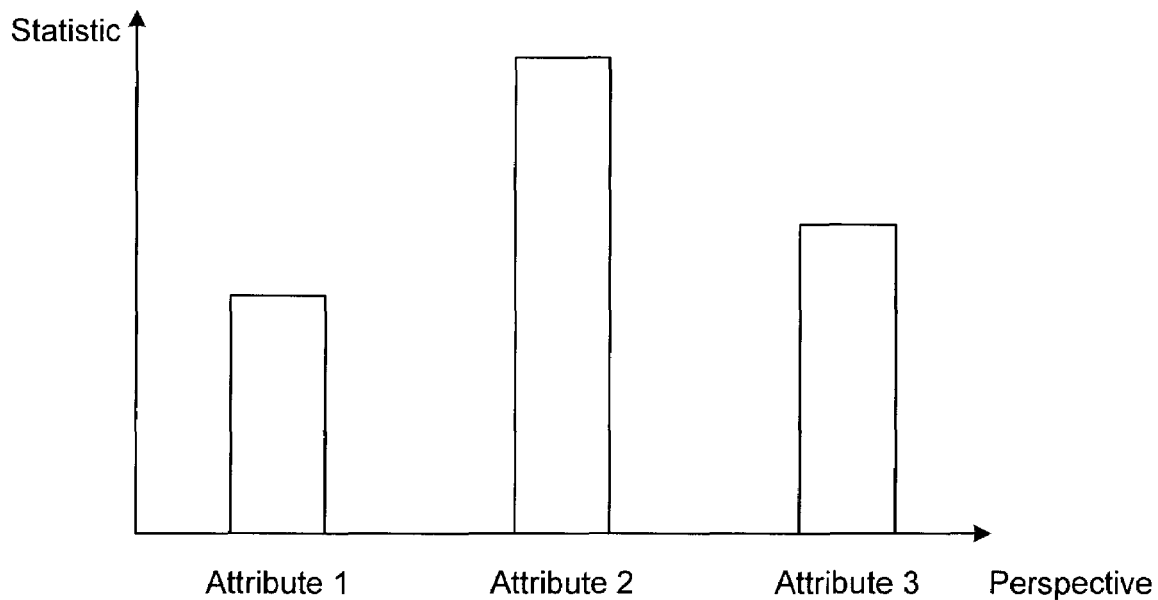
FIG. 14 is an illustrative visualization of process execution data summarized in terms of a user-selected statistic presented across a user-selected perspective corresponding to an attribute dimension of a user-selected process entity.

Referring to FIGS. 8, 9 and 14, after the user has specified the focus point, the statistic, the perspective, and the restrictions (if any), the process execution data is queried (step 200; FIG. 8). The query may be in the form of a conventional Structured Query Language SQL data warehouse query generated based upon the user-selected process entity, the user-selected statistic, and the user-selected perspective. For example, in one embodiment, a query is written in SQL, and is composed of a SELECT, FROM, WHERE, and GROUP BY clauses. The SELECT clause identifies what is to be returned to the user, and is therefore defined as the statistic requested by the user. The FROM part defines the data structures that should be considered by the query, and it includes the data structures that store information about the selected focus point (required to generate the statistic), the data structures that store information on the selected perspective (required to retrieve the different elements of the perspective, that will form the basis for the aggregation), and finally all the data structures that store information about attributes that appear in the restriction clause. The WHERE clause contains the code necessary to implement the restriction code. The GROUP BY clause groups the selected result based on the different elements of the perspective, to enable the generation of a different aggregate value for each element of the perspective.

The query results are visualized in terms of the user-selected statistic presented across the user-selected perspective corresponding to an attribute dimension of the user-selected focus point, as shown in FIG. 14. Among the kinds of information that may be presented by business process cockpit 120 are the exemplary visualizations presented in the attached Appendix.

Referring back to FIG. 7, in response to analysis results or prediction results, or both, a user may modify execution of a subsequent business process instance (step 202). For example, in some embodiments, at least one of the following business process aspects may be modified: a selection of resources applied to individual activities of the business process, a path of execution, a process definition, an activity priority, and a resource assignment criterion.

Figure 15:
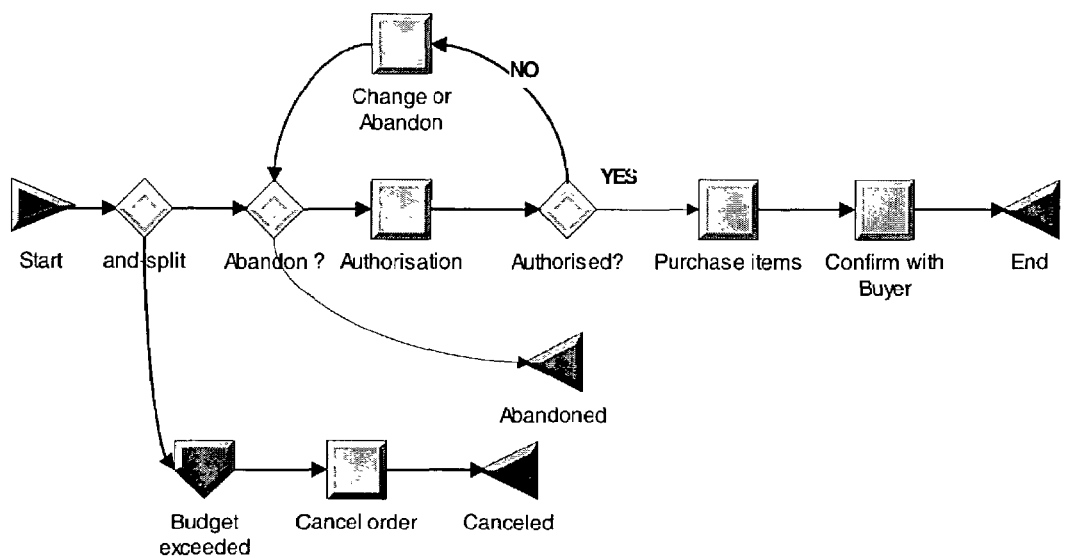
FIG. 15 is an exemplary workflow diagram of a business process that includes an event node operable to monitor for alert events.

Besides providing reports on completed executions, business process cockpit 120 also is operable to monitor running executions (e.g., to detect the occurrence of critical situations that must be corrected). For this purpose, business process cockpit 120 allows analysts to define alerts (i.e., situations that need to be detected and on which actions need to be taken). Alerts may be is defined by instantiating templates in a way analogous to the way categories are defined in the above-described embodiments. An example of an alert template is "processes P stopped at node N for more than M minutes." In addition, users may associate alerts to specific actions. For each alert, the following two actions can be defined: a message, and an event. The message may be an email, a pager, or a cell phone message and may be sent to a specified user. In some embodiments, the message may be published on a JMS (Java Messaging Service) bus for consumption by any interested enterprise management application that subscribed to published alerts. The message may be defined as a simple string or as a parametric string, with the parameters referring to the behavior condition values that triggered the alert (e.g., for alerts on process duration being more than a certain threshold, it may be possible to include the actual duration in the message). The event may be sent to the process instance for which the alert has been detected. The event may trigger an activity in the process instance. For example, a process definition may include branches that subscribe to alert events and that perform suitable actions when the event is received, as shown in the sample process of FIG. 15, where the process includes event "budget exceeded", that can be activated by the cockpit when the corresponding alert is detected.

The systems and methods described herein are not limited to any particular hardware or software configuration, but rather they may be implemented in any computing or processing environment, including in digital electronic circuitry or in computer hardware, firmware or software. In general, the components of the business operational intelligence engine may be implemented, in part, in a computer process product tangibly embodied in a machine-readable storage device for execution by a computer processor. In some embodiments, these systems preferably are implemented in a high level procedural or object oriented processing language; however, the algorithms may be implemented in assembly or machine language, if desired. In any case, the processing language may be a compiled or interpreted language. The methods described herein may be performed by a computer processor executing instructions organized, for example, into process modules to carry out these methods by operating on input data and generating output. Suitable processors include, for example, both general and special purpose microprocessors. Generally, a processor receives instructions and data from a read-only memory and/or a random access memory. Storage devices suitable for tangibly embodying computer process instructions include all forms of non-volatile memory, including, for example, semiconductor memory devices, such as EPROM, EEPROM, and flash memory devices; magnetic disks such as internal hard disks and removable disks; magneto-optical disks; and CD-ROM. Any of the foregoing technologies may be supplemented by or incorporated in specially designed ASICs (application-specific integrated circuits).

Other embodiments are within the scope of the claims.

APPENDIX

Among the kinds of information that may be presented by business process cockpit 120 are the following exemplary visualizations.

1. Processes and Process Groups

The following basic statistics may be presented for processes and process groups:
- process execution time
- throughput
- number of active instances
- number of activations
- number of completions
- time spent at each node (over time periods)
    - absolute and relative to the total instance execution time
        The following value indicators may be presented for processes and process groups:
- process execution cost (e.g., total, average)
- process revenues (e.g., total, average)
- process profits (e.g., total, average)

Among the key process-level indicators for the process/process group focus point are the following:
- average time per process
- cost per process
- revenue per process
- profit per process
- percentage of completed process that fall into each category
- highlight violation of thresholds, or risks thereof
- "critical" nodes (e.g., bottlenecks)
- throughput Among the possible visualization techniques for the process/process group focus point are the following:
- Brief in formation illustrated on the process flow diagram about the execution history of a process (e.g., colors used to indicate warnings for individual nodes, or displaying percentage of choosing individual paths at route nodes)
- Average percentage of time spent at each service will appear near work nodes when the user moves a mouse pointer over work nodes
- Charts with all key quality indicators displayed with the same criteria. Time, cost and revenue may be represented in the same chart.
- When a user clicks on a node, perspective changes to "service" Type, showing details about the selected node (e.g., average processing times)

2. Resources and Resource Groups

The following basic statistics may be presented for resources and resource groups:
- service execution time
- number of concurrently active services managed by the resource
- number of completed services
- performance indexes may be defined based on the performance relative to the resource itself and relative to other resources The following value indicators may be presented for resources and resource groups:
- total resource cost
- total cost per service or per process
- average cost per service or per process
- cost distributions Among the key process-level indicators for the resource/resource group focus point are the following:
- number of active services
- number of completed services
- cost
- performance/quality indexes
- highlight cost about a limit, performance below a threshold, or excessive load Among the possible visualization techniques for the resource/resource group focus point are the following:
- Show a list of services in which a particular resource is involved
- For each service, display the average time spent by resource
- Users may click in a service name to change the perspective to service type 3. Services and Service Groups The following basic statistics may be presented for services and service groups:
- execution time
- number of activations
- number of completions The following value indicators may be presented for services and service groups:
- service cost Among the key process-level indicators for the services/service group focus point are the following:
- number of activations and completions
- average duration
- cost
- highlight outliers, costs/durations above thresholds Among the possible visualization techniques for the service/service group focus point are the following:
- Show a list of resources involved in service
- Overall average processing time of a service shown at the top of a page
- For each resource that may be assigned to a service, display the average processing time by that resource
- Users may click on a resource name to change the perspective to resource type 4. Time The following basic statistics may be presented for the time perspective:
- number of process activations
- number of process completions
- number of service activations
- number of service completions
- number of concurrently active services
- process performance with respect to the average (e.g., how instances in a process are performing this week with respect to the average duration of the last year)

The following value indicators may be presented for the time perspective:
- total revenue
- cost
- profit Among the key process-level indicators for the time perspective are the following:
- cost, revenue, profit
- number of process/service activations/completions
- relative performance 5. Events The following basic statistics may be presented for the events focus point:
- number of event instances sent/received
- number (and percentage) of different instances that have sent/received events of this type
- number of different processes that have sent/received event of this kind The following value indicators may be presented for the system focus point:
- cost
- revenue 6. System The following basic statistics may be presented for the system focus point:
- active processes/services
- process/service activations
- process/service completions
- number of busy/idle resources
- performance (latency, throughput) compared to the average, and highlight particularly good/bad
- alerts
- inefficiencies The following value indicators may be presented for the system focus point:
- cost
- revenue Among the key process-level indicators for the system focus point are the following:
- status (ok, problems), bottlenecks, alerts
- active processes, services
- overall performance

What is claimed is:

1. A machine-implemented method of investigating one or more business processes each involving a respective set of one or more activities each defined by a respective service and performed by a respective set of one or more resources, the method comprising:
   providing an interface that enables a user to (i) select a process entity from any of one or more of the business processes, one or more of the services, and one or more of the resources, (ii) select a statistic from a set of multiple statistics, and (iii) select a perspective derived from one or more attribute dimensions of the user-selected process entity;
   querying a business process data warehouse comprising records derived from process execution data generated during execution of one or more instantiations of the one or more business processes, wherein the querying comprises deriving the user-selected statistic from ones of the records comprising data relating to the user-selected process entity and the user-selected perspective; and
   on a display visualizing the user-selected statistic presented across the user-selected perspective;
   wherein the interface enables the user to define the perspective in terms of a taxonomy comprising multiple categories each of which defines a respective Boolean condition on the records of the business process data warehouse, the interface enables the user to (i) label the taxonomy, (ii) label each of the categories, and (iii) specify each of the conditions on the records, and the querying comprises classifying ones of the records of the business process data warehouse into the categories of the taxonomy based on the respective Boolean conditions.

2. The method of claim 1, wherein the interface enables the user to specify the Boolean conditions in terms of any of: number of activations of a node of any of the business processes; assignment of a node of any of the business processes to any of the resources; duration of a node of any of the business processes; duration of any of the business processes; a value of data items at instantiation time of any of the business processes, completion time of any of the business processes, or after execution of a node of any of the business processes.

3. The method of claim 1, wherein the interface enables the user to select the statistic from each of: a count; running time; and a standard deviation of running time.

4. The method of claim 1, wherein the querying comprises generating a query on the records of the business process data warehouse based upon the user-selected process entity, the user-selected statistic, and the user-selected perspective.

5. The method of claim 4, wherein the querying comprises generating the query with a SELECT clause defining the user-selected statistic and a FROM clause identifying the ones of the records relating to the user-selected process entity and the user-selected perspective.

6. The method of claim 1, wherein the interface enables the user to select the process entity from each of: one or more of the businesses processes; one or more of the services; and one or more of the resources.

7. The method of claim 1, wherein the interface enables the user to select the perspective from each of: a time-based perspective; one or more of the services; one or more of the resources; an initiator of any of the business processes; a node of any of the business processes.

8. The method of claim 1, wherein the interface enables the user to define the statistic in terms of an attribute dimension of one or more of the business processes.

9. The method of claim 8, wherein the interface enables the user to (i) label the statistic, (ii) select one of the business processes, and (iii) select the attribute dimension of the selected business process.

10. The method of claim 1, wherein the interface enables the user to select one or more restrictions, and the querying comprises filtering the records of the business process data warehouse based upon the one or more user-selected restrictions.

11. The method of claim 10, wherein the interface enables the user to select the one or more restrictions from each of: one or more of the services; an initiator of any of the business processes; one or more of the resources; a node of any of the business processes; and a time period.

12. The method of claim 1, further comprising monitoring an execution of an instance of any of the business processes, wherein the monitoring comprises detecting occurrences of one or more specified conditions during execution of the business process instance.

13. The method of claim 12, wherein the monitoring comprises detecting occurrence of an alert condition during execution of the monitored business process instance.

14. The method of claim 13, wherein the interface enables the user to (i) define the alert condition in terms of a detection rule applicable to process execution data generated during execution of the business process instance, and (ii) associate the alert condition with an action that is triggered in response to detection of the alert condition.

15. The method of claim 14, wherein the interface enables the user to associate the alert condition with an action that generates a notification in response to detection of the alert condition.

16. A computer readable medium for investigating one or more business processes each involving a respective set of one or more activities each defined by a respective service and performed by a respective set of one or more resources, the computer-readable medium comprising computer-readable instructions which, when executed by a computer, cause the computer to perform operations comprising:

providing an interface that enables a user to (i) select a process entity from any of one or more of the business processes, one or more of the services, and one or more of the resources, (ii) select a statistic from a set of multiple statistics, and (iii) select a perspective derived from one or more attribute dimensions of the user-selected process entity, wherein the interface enables the user to define the perspective in terms of a taxonomy comprising multiple categories each of which defines a respective Boolean condition on the records of a business process data warehouse comprising records derived from process execution data generated during execution of one or more instantiations of the one or more business processes, and the interface enables the user to (i) label the taxonomy, (ii) label each of the categories, and (iii) specify each of the conditions on the records;

querying the business process data warehouse, wherein the querying comprises deriving the user-selected statistic from ones of the records comprising data relating to the user-selected process entity and the user-selected perspective, wherein the querying comprises classifying ones of the records of the business process data warehouse into the categories of the taxonomy based on the respective Boolean conditions; and on a display visualizing the user-selected statistic presented across the user-selected perspective.

17. A system for investigating one or more business processes each involving a respective set of one or more activities each defined by a respective service and performed by a respective set of one or more resources, the system comprising:

a memory storing instructions; and a processor configured to execute the instructions to perform operations comprising prompting a user to (i) select a process entity from any of one or more of the business processes, one or more of the services, and one or more of the resources, (ii) select a statistic from a set of multiple statistics, and (iii) select a perspective derived from an attribute dimension of the user-selected process entity, wherein in executing the instructions the processor prompts the user to define the perspective in terms of a taxonomy comprising multiple categories each of which defines a respective Boolean condition on the records of a business process data warehouse comprising records derived from process execution data generated during execution of one or more instantiations of the one or more business processes, and in executing the instructions the processor prompts the user to (i) label the taxonomy, (ii) label each of the categories, and (iii) specify each of the conditions on the records;

based upon the user-selected process entity, statistic and perspective, querying the business process data warehouse, wherein the querying comprises deriving the user-selected statistic from ones of the records comprising data relating to the user-selected process entity and the user-selected perspective, wherein the querying comprises classifying ones of the records of the business process data warehouse into the categories of the taxonomy based on the respective Boolean conditions; and on a display visualizing the user-selected statistic presented across the user-selected perspective.

18. The system of claim 17, wherein in executing the instructions the processor prompts the user to specify the Boolean conditions in terms of any of: number of activations of a node of any of the business processes; assignment of a node of any of the business processes to any of the resources; duration of a node of any of the business processes; duration of any of the business processes; a value of data items at instantiation time of any of the business processes, completion time of any of the business processes, or after execution of a node of any of the business processes.

19. The system of claim 17, wherein in executing the instructions the processor prompts the user to select a statistic from each of: a count; running time; and a standard deviation of running time.

20. The system of claim 17, wherein in executing the instructions the processor prompts the user to define the statistic in terms of an attribute dimension of one or more of the business processes.

21. The system of claim 20, wherein in executing the instructions the processor prompts the user to (i) label the statistic, (ii) select one of the business processes, and (iii) select the attribute dimension of the selected business process.

22. The system of claim 17, wherein in executing the instructions the processor prompts the user to select the process entity from each of: one or more of the businesses processes; one or more of the services; and one or more of the resources.

23. The system of claim 17, wherein in executing the instructions the processor prompts the user to select the perspective from each of: a time-based perspective; one or more of the services; one or more of the resources; an initiator of any of the business processes; a node of any of the business processes.

24. The system of claim 17, wherein in executing the instructions the processor prompts the user to select one or more restrictions, and wherein the processor is configured to execute the instructions to filter the process execution data based upon the one or more user-selected restrictions.

25. The system of claim 24, wherein in executing the instructions the processor prompts the user to select the one or more restrictions from each of: one or more of the services; an initiator of one or more of the business processes; one or more of the resources; a node of any of the business processes; and a time period.

26. The system of claim 17, wherein in executing the instructions the processor performs operations comprising monitoring execution of an instance of any of the business processes, wherein the monitoring comprises detecting occurrences of one or more specified conditions during execution of the business process instance.

27. The system of claim 26, wherein the detecting comprises detecting occurrence of an alert condition during execution of the monitored business process instance.

28. The system of claim 27, wherein in executing the instructions the processor prompts the user to (i) define the alert condition in terms of a detection rule applicable to process execution data generated during execution of the business process instance, and (ii) associate the alert condition with an action that is triggered in response to detection of the alert condition.

29. The system of claim 27, wherein in executing the instructions the processor prompts the user to associate the alert condition with an action that generates a notification in response detection of the alert condition.

30. The system of claim 27, wherein in executing the instructions the processor prompts the user to associate the alert condition with an action that triggers an activity in the business process instance in response to detection of the alert condition.

\* \* \* \* \*